E. P. LA BOUNTY.
DEVICE FOR FACILITATING THE REMOVAL AND REPLACING OF TIRE VALVES.
APPLICATION FILED MAY 26, 1915.
1,170,284.
Patented Feb. 1, 1916.
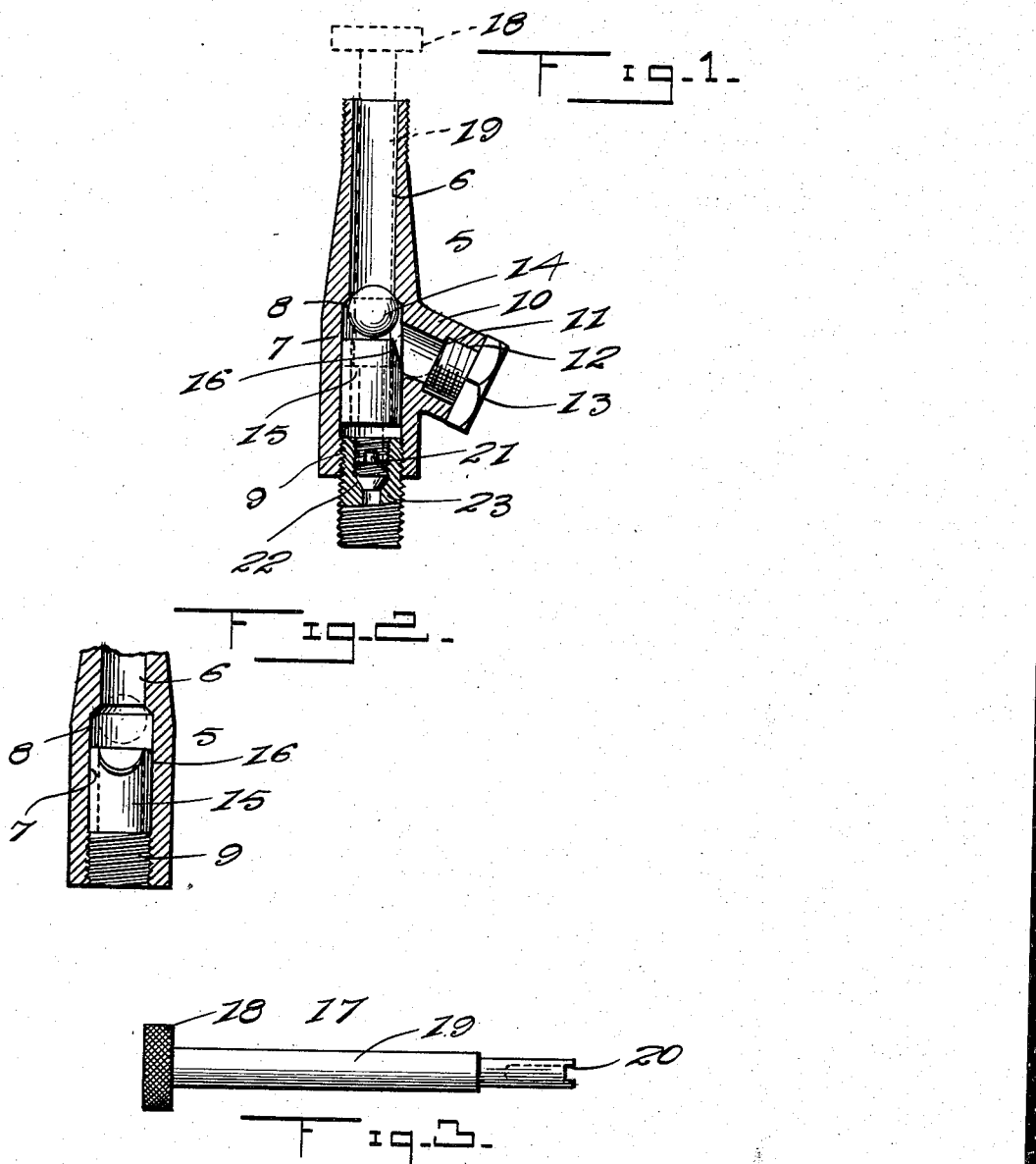
Witnesses
C. P. Bealle.
Inventor
E. P. LaBounty.
By 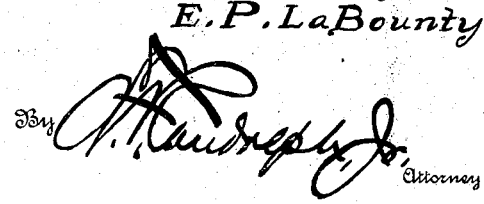
Attorney

UNITED STATES PATENT OFFICE.

EDWARD P. LA BOUNTY, OF HOOPESTON, ILLINOIS.

DEVICE FOR FACILITATING THE REMOVAL AND REPLACING OF TIRE-VALVES.

1,170,284.  Specification of Letters Patent.  Patented Feb. 1, 1916.

Application filed May 26, 1915. Serial No. 30,636.

*To all whom it may concern:*

Be it known that I, EDWARD P. LA BOUNTY, a citizen of the United States, residing at Hoopeston, in the county of Vermilion and State of Illinois, have invented certain new and useful Improvements in Devices for Facilitating the Removal and Replacing of Tire-Valves; and I do hereby declare the following to be a full, clear, and exact description of the invention, such as will enable others skilled in the art to which it appertains to make and use the same.

This invention has for its primary object to provide an efficient device attachable to the valve stem of a tire for facilitating the removal of a broken or leaky valve for replacing or repairing the latter with a very slight loss of air from the tire.

With this and other objects in view, the invention consists in the novel construction, arrangement and formation of parts as will be hereinafter specifically described, claimed and illustrated in the accompanying drawing, in which:

Figure 1 represents a longitudinal sectional view through the device, illustrating the same attached to a fragment of a valve stem of a tire. Fig. 2 represents a fragmental longitudinal sectional view through the device taken at right angles to Fig. 1, and Fig. 3 represents a side elevation of the tire valve removing tool.

Referring to the drawing in detail, wherein similar reference numerals designate corresponding parts throughout the several views, the numeral 5 indicates generally the cylindrical body of the device, which is preferably cylindrical in formation and provided with a plain longitudinal bore 6, enlarged at 7 adjacent one end of the body to define an annular inclined shoulder 8 constituting a seat for a valve to be hereinafter described. The outer extremity of the enlarged portion 7 of the longitudinal bore is internally screwthreaded to fit the external screwthreads ordinarily provided upon tire valve stems.

The body 5 is formed with an integral oblique extension 10 having an internal bore 11 of approximately the same diameter as the enlarged portion 7 of the bore of the body and communicating therewith at a point adjacent the annular inclined shoulder 8. The outer extremity 12 of the bore of the extension 10 is enlarged and internally screwthreaded to fit the shank of a bolt 13.

A ball valve 14 is mounted in the enlarged portion 7 of the bore and is adapted to seat against the annular inclined shoulder 8 to prevent the passage of air longitudinally through the bore from the large to the small end thereof.

An annular retaining element 15 having an internal diameter less than the diameter of the ball valve 14 is secured in the enlarged portion 7 of the bore in spaced relation to the annular shoulder or seat 8 and is cutaway at 16 adjacent the oblique extension 10 to permit the ball 14 to pass to and from the bore 11 of the extension 10. A tire valve removing tool, designated generally by the numeral 17, includes a head or handle 18 and a shank 19, the free end 20 of which is bifurcated and adapted to receive the lugs 21 formed upon the tire valve retaining element 22, which is threaded into the end of the tire valve stem 23, illustrated in Fig. 1.

When it is desired to remove a leaky valve to repair or replace the same, the screwthreaded portion 9 of the bore of the body is fitted upon the tire valve stem 23, as clearly illustrated in Fig. 1, and the vehicle wheel is so positioned that the ball valve 14 will drop by gravity upon its seat 8. The shank 19 of the tool 17 is inserted through the bore 6 of the body, moving the ball valve 14 to the dotted line position in Fig. 1 and engaging the bifurcations 20 thereof with the lugs 21 of the tire valve retaining element 22. The tool 17 is subsequently rotated to remove the valve from the tire in the usual manner and immediately upon removal of said valve from the bore 6 the ball valve 14 is seated upon the shoulder 8 by gravity to stop the flow of air from the tire. Subsequent to removal the tire valve is repaired or a new one substituted therefor and is replaced in the valve stem 22 by the tool 17, the pressure exerted against the ball valve 14 when inserting the new or repaired tire valve unseats said valve and causes the same to move into the bore 11 of the extension 10, thus permitting the tire valve to be positioned and secured in the valve stem 23.

What I claim is:

A device for facilitating the removal and replacing of tire valves including a body having a longitudinal bore enlarged adjacent one end to define an annular shoulder constituting a valve seat, internal screwthreads formed in the enlarged portion of the bore of said body adapted to fit the external screwthreads of a pneumatic tire valve stem, a ball valve adapted to engage said seat, a lateral extension on said body having a bore of adequate size to receive said ball valve and communicating with the bore of said body at a point intermediate the screwthreaded end of the bore and said annular shoulder, a removable closure for the outer extremity of said extension, and an annular retaining element for said valve having a cutaway portion permitting said valve to move from said seat into said extension.

In testimony whereof I affix my signature in presence of two witnesses.

EDWARD P. LA BOUNTY.

Witnesses:
CHAS. D. HINKLE,
MAMIE B. KAVANAUGH.

Copies of this patent may be obtained for five cents each, by addressing the "Commissioner of Patents, Washington, D. C."